United States Patent
Preslan

(10) Patent No.: US 10,019,451 B2
(45) Date of Patent: Jul. 10, 2018

(54) PATH LOOKUP IN A HIERARCHICAL FILE SYSTEM

(75) Inventor: Kenneth William Preslan, Minneapolis, MN (US)

(73) Assignee: Quantum Corporation, San Jose, CA (US)

( * ) Notice: Subject to any disclaimer, the term of this patent is extended or adjusted under 35 U.S.C. 154(b) by 1201 days.

(21) Appl. No.: 13/248,084

(22) Filed: Sep. 29, 2011

(65) Prior Publication Data

US 2013/0086121 A1    Apr. 4, 2013

(51) Int. Cl.
G06F 12/00     (2006.01)
G06F 17/30     (2006.01)

(52) U.S. Cl.
CPC .............................. *G06F 17/30091* (2013.01)

(58) Field of Classification Search
CPC ......... G06F 12/0246; G06F 2212/7207; G06F 17/30067; G06F 11/1435; G06F 17/30091
USPC ....................................................... 707/829
See application file for complete search history.

(56) References Cited

U.S. PATENT DOCUMENTS

| | | | |
|---|---|---|---|
| 6,230,200 B1 * | 5/2001 | Forecast et al. ............. | 709/226 |
| 7,752,226 B1 * | 7/2010 | Harmer et al. .............. | 707/796 |
| 8,266,136 B1 * | 9/2012 | Pogde et al. ................ | 707/711 |
| 8,510,510 B1 * | 8/2013 | Patil ...................... | G06F 17/301 |
| | | | 711/136 |
| 8,875,222 B1 * | 10/2014 | Chang .................... | H04L 9/088 |
| | | | 713/151 |
| 2003/0009484 A1 * | 1/2003 | Hamanaka et al. .......... | 707/200 |
| 2003/0182312 A1 * | 9/2003 | Chen et al. ................ | 707/200 |
| 2007/0011139 A1 * | 1/2007 | Burnett ............................ | 707/1 |
| 2007/0061279 A1 * | 3/2007 | Christiansen et al. ............ | 707/1 |
| 2008/0215663 A1 * | 9/2008 | Ushiyama ......... | G06F 17/30094 |
| | | | 709/201 |
| 2008/0243773 A1 * | 10/2008 | Patel et al. ......................... | 707/2 |
| 2010/0057755 A1 * | 3/2010 | Schneider .................... | 707/100 |

* cited by examiner

*Primary Examiner* — Neveen Abel Jalil
*Assistant Examiner* — Dawaune Conyers
(74) *Attorney, Agent, or Firm* — Eschweiler & Potashnik, LLC

(57) ABSTRACT

Apparatus and methods are provided herein for path lookup in a hierarchical file system. An inode associated with a requested object is identified. The inode may be organized in an inode table and identified in the table using an inode number. Ancestry information and size constraint information may also be available for the inode. An inode chain associated with the pathway is identified based, at least in part, on ancestry information associated with the inode for the requested object. A size constraint analysis is performed for the requested object. The size altering operation is selectively performed based on the size constraint analysis.

15 Claims, 6 Drawing Sheets

| Inode Table 300 | | |
|---|---|---|
| Inode | Ancestry Information | Size Constraint |
| Root Directory Inode 310 | 311 | No 312 |
| Subdirectory A Inode 320 | Root Directory Inode 321 | Yes 322 |
| Subdirectory B Inode 330 | Root Directory Inode 331 | No 332 |
| Subdirectory C Inode 340 | Root Directory Inode 341 | No 342 |
| Subdirectory D Inode 350 | Subdirectory A Inode, Root Directory Inode 351 | Yes 352 |
| Subdirectory E Inode 360 | Subdirectory A Inode, Root Directory Inode 361 | Yes 362 |
| Subdirectory F Inode 370 | Subdirectory C Inode, Root Directory Inode 371 | No 372 |
| File E(1) Inode 380 | Subdirectory E Inode, Subdirectory A Inode, Root Directory Inode 381 | Yes 382 |
| ⋮ | ⋮ | ⋮ |
| File E(n) Inode 390 | Subdirectory E Inode, Subdirectory A Inode, Root Directory Inode 391 | Yes 392 |

Figure 3

PATH LOOKUP IN A HIERARCHICAL FILE SYSTEM

BACKGROUND

File systems store and organize collections of data and information about the data (e.g., metadata). Discrete collections of data are referred to as objects. One familiar object is a file. File systems are generally arranged in a hierarchy. Arranging the objects in a hierarchy allows users to organize the objects. A hierarchical file system includes a root directory. A root directory may be the parent of a set of subdirectories. The subdirectories associated with the root directory may include further subdirectories. In this manner, subdirectories extend from the root directory to varying levels in the hierarchical file structure.

A pathway is defined by a series of subdirectories that are passed through from the root directory to arrive at an object (e.g., a subdirectory, file). Therefore, the pathway is a map through the hierarchical file system from the root directory to the object. The hierarchical file system may be used in a single system (e.g., a computer, node, data stream) or a system distributed over multiple nodes (e.g., network).

As computing systems become more robust, more objects can be stored in the hierarchical file system. Technological advances have made it possible for personal computers to have hundreds of gigabytes of storage and handheld devices (e.g., cellular phones, music playback devices, cameras) to have gigabytes of storage. Thus, the ability to store hundreds of thousands of objects is no longer limited to sophisticated entities. However, hierarchical file systems may succumb to the realities of limited storage, despite being able to store vast amounts of data due to, for example, limitations or inefficiencies associated with conventional file system data structures.

In addition to storing objects, metadata associated with the objects is stored. Objects may not automatically store data about themselves. Therefore, a file system may store the metadata for objects in inodes. When an object is created, a corresponding inode may be created by the file system. The inode stores metadata (e.g., author data, size data, timestamp) about the object. To determine the relationship between objects and inodes, an object is associated with a specific inode using an inode number. Inodes may be organized in an inode table. An inode number may represent an inode's location in the inode table.

An inode is used by the hierarchical file system to support requested operations pertaining to the object. Some operations cause the size of objects to change. For example, a save command may change the size of an object if the object has been altered. Changing the size of an object may have ramifications for other objects on the pathway. Thus, inodes for different objects on the pathway may need to change as the metadata associated with the object changes due to size altering operations. Conventionally, inodes are stored in the hierarchical file system. As inodes are changed, reads are executed on the computer storage medium. This can be inefficient and time consuming. The inodes may be distributed at different locations in the hierarchical file system, increasing the time and processing power needed to identify and locate them.

While the metadata of an inode may be relevant to performing an operation associated with an object, the information available in an inode may be inadequate to identify and locate additional inodes in the computer storage medium. The inode may contain metadata regarding one specific object but not other objects in the hierarchical file system. Furthermore, identifying and locating inodes stored in the hierarchical file system may be inefficient and slow.

A file system may have a large number of files and thus may have a large number of inodes. Just like some files may be in memory and other files may not be in memory (e.g., on disk, on disk), some inodes may be in memory while others are stored on relatively slower devices. Eviction, replacement, and pre-fetch processes may be tasked with determining which files and/or inodes should be stored in the limited memory available and which should be stored elsewhere.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates an example of an inode table used in path lookup in a hierarchical file system.

DETAILED DESCRIPTION

Figure 1:
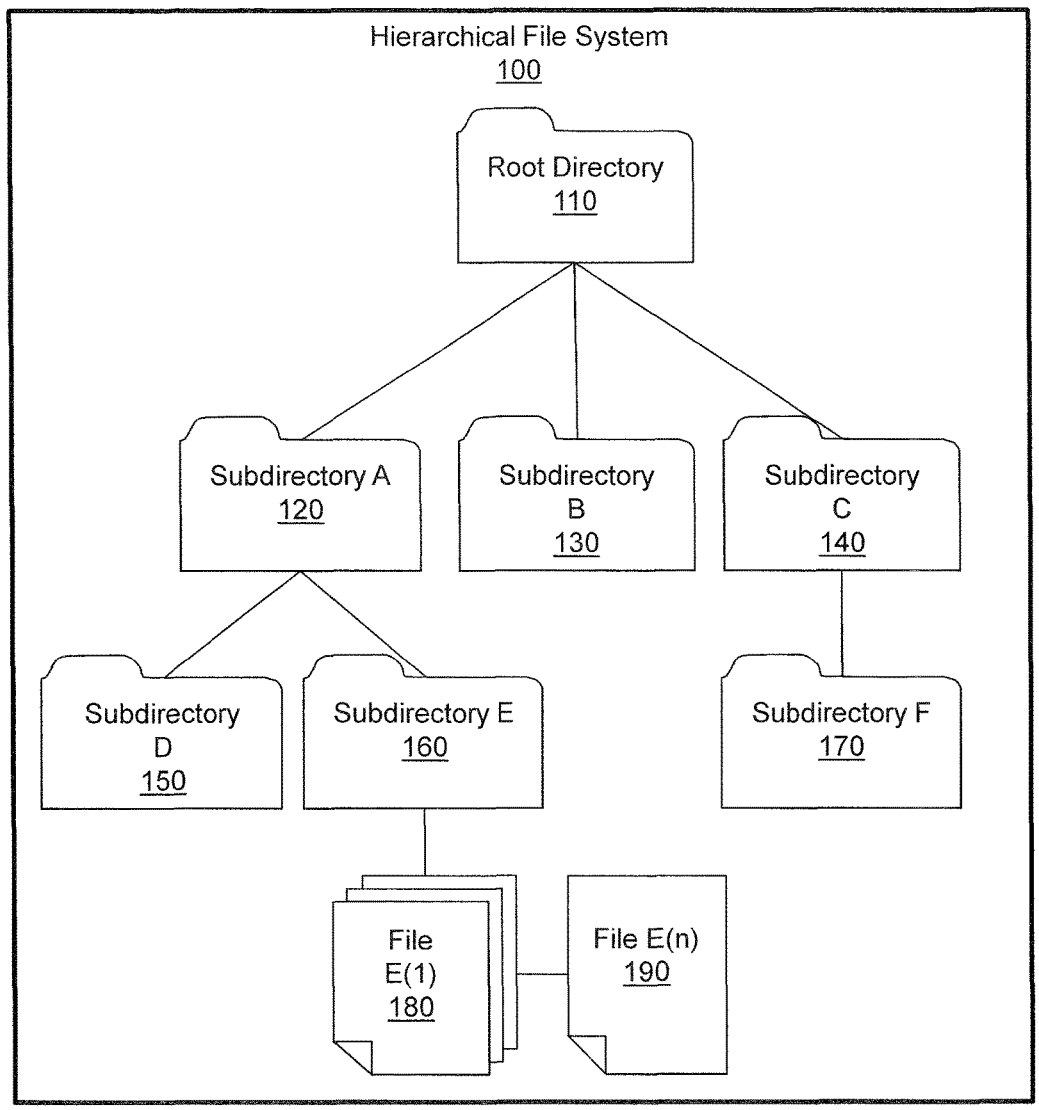
FIG. 1 illustrates an example of a hierarchical file system.

Example apparatus and methods perform path lookups associated with an inode table related to a hierarchical file system. In one embodiment, unlike conventional systems, example enhanced inodes may store more information about other inodes. In another embodiment, additional information about inodes may be stored in additional data structures (e.g., ancestry table, size constraint table). Example systems and methods may store reverse path lookup (RPL) information for inodes. Thus an inode may know what directories contain the inode and what names are in those directories. Or, information about an inode may be available where the information concerns what directories contain the inode. In one embodiment, the enhanced inodes and/or the additional information may be stored in a relatively faster (e.g., cache memory) to facilitate more efficient access. It is possible that the relatively faster location may only be able to hold a subset of the enhanced inodes or a subset of the additional information. File systems are typically arranged as a hierarchy of subdirectories used to organize objects stored, for example, in devices that include, but are not limited to disk, optical disk, shared disk, database, network, tape.

A hierarchical file system is an organizational approach to data storage. Conventionally, inodes have been stored in the hierarchical file system. To retrieve conventional inodes from the hierarchical file system, the inodes were retrieved from the one or more storage locations on the one or more storage devices. This can be slow and require additional processing time and processing power. Example apparatus and methods store enhanced inodes in cache memory. The enhanced inodes may be organized in an inode table located in the cache memory. Inodes are retrieved from the cache memory with a read that is comparatively faster than locating a conventional inode from the one or more storage locations on the one or more storage devices. Therefore, storing an inode table in a cache memory increases the speed of path lookups in a hierarchical file system. Since the cache may be too small to hold all the enhanced inodes, example systems and methods may employ eviction, replacement, and/or pre-fetch strategies to keep relevant enhanced inodes in memory or in a cache. In different embodiments, the root inode may be held more often or even permanently in memory or cache. Similarly, some inodes (e.g., those with limits) may be held more often or even permanently in the cache. When the additional information is stored in separate data structures, portions of those data structures may also be moved between relatively faster devices (e.g., memory, cache) and relatively slower devices (e.g., disk, tape).

Storing enhanced inodes in a cache memory allows a user to quickly retrieve an inode associated with a requested object. An object may be requested so that a size altering operation can be performed. A size altering operation may include, but is not limited to, a save command, a create command, a write command, a write append command, a move command, a relocate command, and a delete command. These commands not only affect the object that they are performed on, but also may affect the subdirectories in which they are stored. Specifically, when the size of the object is changed, the sizes of the subdirectories along the pathway from the root directory to the object also change in size. Additionally, one or more subdirectories in the path may be associated with a size constraint.

Conventionally, inodes describe a relationship between an object and its metadata. However, conventional inodes do not offer information about the object's relationship with other objects in the hierarchical file system. For example, an inode may include the size of the object that that it is associated with, but not a size constraint on the size of the object. The limited nature of storage space may necessitate that size constraints be placed on the objects. Because changing an object can have ramifications for objects along the pathway, it would be desirable for an inode to identify inodes along the pathway that may be affected by the size altering operation to facilitate, for example, preventing the violation of size constraints. Furthermore, it would be desirable for an inode to identify size constraints placed on the objects in the pathway as the objects on the pathway may be affected by the size altering operation. In one embodiment, enhanced inodes may store size constraint information themselves. However, in another embodiment, an inode may not store size constraint information itself but may have size constraint information stored on its behalf. The size constraint information may be stored in, for example, a quota file, a quota information object, a quota information representation, and so on. The size constraint information may include, for example, both constraint information and current usage information. Ancestry information may also be stored separately on behalf of an inode rather than being stored in an enhanced inode.

At times including when a file system, volume, or other collection of files is accessed (e.g., mounted), the size constraint information may also be accessed. In one example, when the size constraint information is accessed an RPL entry may be manipulated (e.g., created, loaded) for a directory that has a constraint. In this embodiment, an on-disk inode may not have information about its own constraints but the representation of the inode in the RPL cache entry will. This embodiment facilitates avoiding the onerous task of manipulating (e.g., changing) conventional on-disk inodes into enhanced inodes that work with the constraint system. In one embodiment the size constraint information (e.g., quota limit, current values) may be organized as a b-tree that is keyed by the inode number of the directory that is the root of the namespace. The b-tree, or other size constraint information holding entity may be accessed (e.g., queried) when quota limit and/or current usage information is desired.

Example apparatus and methods include ancestry information in the inode table or in separate locations (e.g., ancestry table, size table). Ancestry information is information about inodes associated with objects on the pathway. Specifically, ancestry information identifies inodes in an inode chain that corresponds with the pathway. Therefore, when an inode is identified in the inode table, the parent information for the inode can also be identified. The ancestry information may include the parent information for the requested inode. The ancestry information may also include the ancestry information for the inodes in an inode chain associated with the pathway from the requested inode to the root directory. An inode chain may identify the parents of successive inodes associated with the pathway to the root directory. The organization of the inode chain corresponds to the pathway. Thus, the inodes can be identified using a pathway lookup to navigate up an inode chain. Compared to conventional apparatus where inodes do not store ancestry information and the conventional inodes may be distributed across one or more data stores on one or more data storage devices. In one embodiment, a single inode table with enhanced inodes supports completing the path lookup more quickly. In another embodiment, an inode table and other data structures or files support completing the path lookup more quickly.

In one example, the ancestry information is not merely location data stored in the inode or an ancestry repository (e.g., RPL table) for the requested object. The ancestry information may be specific to inodes. The ancestry data identifies at least the parent of the inode associated with the requested file. Therefore, once a first inode is identified, the first inode's parent, a second inode, can be identified. The second inode's parent, a third inode, can be identified from ancestry information stored in conjunction with the second inode. Alternatively, the first inode may store ancestry information with respect to both the second inode and the third inode. Therefore, the first inode, the second inode, and the third inode can be identified by walking up an inode chain starting with the inode associated with the requested object. When RPL information is available in relatively faster storage (e.g., cache, memory) then following the ancestry information may be performed more quickly than in conventional systems where the ancestry information may not be available or, if it is available, may only be available on slower devices.

It may also be desirable to walk down an inode chain. For example, once a first inode associated with a requested object is identified, the inode may include data that identifies a child inode. Therefore, in addition to ancestry information, the inode or other location may include progeny (e.g., child) information. Information about an inode child may be relevant because the child inode may be affected by a change in the first inode associated with the requested object. Accordingly, in addition to walking up an inode chain, inodes or related structures may include information that enables walking down the inode chain.

In example apparatus and methods, size constraint information is also stored in association with the inodes. The size constraint information is not merely size data stored in the inode for the requested object. The size constraints identify size limitations that may be placed on the requested object (e.g., directory, subdirectory, file). Size constraints may also identify size limitations placed on objects along the pathway. For example, size constraints may dictate the maximum size for an object. Alternatively, a size constraint may identify the amount by which an object is allowed to change in a given transaction. Size constraint information may also describe the maximum total file size for all files in a directory and/or the maximum total file size for all files in a directory and its subdirectories. The size constraint information may be stored in an RPL repository entry associated with an inode. Size constraint information may take the form of an indicator (e.g., flag, alert, error message). The indicator may indicate that the maximum size for an object would be violated if the size altering operation was performed. These are examples of how the size constraint information may be displayed and used. One of ordinary skill in the art will recognize that there are other ways that the size constraint information can be displayed and used.

When an object in the hierarchical file system is requested for a size altering operation, the associated inode is identified from the inode table. Ancestry information for the inode is identified. The ancestry information can be retrieved from an RPL repository entry. The ancestry information identifies at least a portion of an inode chain associated with the pathway for the requested object. Using the ancestry information, a size constraint analysis can be performed for the object and the at least a portion of the inode chain. If the size constraint analysis determines that the size altering operation would violate the size constraint of the identified inode or a size constraint associated with the inodes on the inode chain, the size altering operation may not be performed.

FIG. 1 illustrates an example hierarchical file system 100 associated with path lookup. Hierarchical file system 100 includes a root directory 110, a number of subdirectories, and objects. The root directory 110, subdirectories, and files are examples of objects. Subdirectory A 120, subdirectory B 130, and subdirectory C 140 are subdirectories of the root directory 110. Therefore, a user may access the root directory 110 to locate subdirectory A 120, subdirectory B 130, or subdirectory C 140. Both subdirectory D 150 and subdirectory E 160 are subdirectories of subdirectory A 120. Files E(1) 180 through E(n) 190, where n is an integer greater than 1, are located in subdirectory E 160. Therefore, the pathway for file E(1) 180 extends from root directory 110, to subdirectory A 120, to subdirectory E 160, to file E(1) 180. Subdirectory B 130 does not have subdirectories. Subdirectory F 170 is a subdirectory of Subdirectory C 140.

The hierarchical file system 100 is a simplified file system intended to highlight the organizational structure of a hierarchical file system. Hierarchical file systems may have more or fewer subdirectories or more or fewer objects. The subdirectories may have pathways that terminate at more or fewer levels. Some hierarchical file systems may have hundreds of thousands of subdirectories with millions of objects. Attempting to organize immense amounts of data may cause inodes to be stored in multiple inode tables located in one or more storage locations on one or more storage devices. Storing inodes in such an inefficient manner makes it increasingly difficult and time consuming to perform path lookups. Alternatively some file systems may be on the same scale as hierarchical file system 100.

Figure 2:
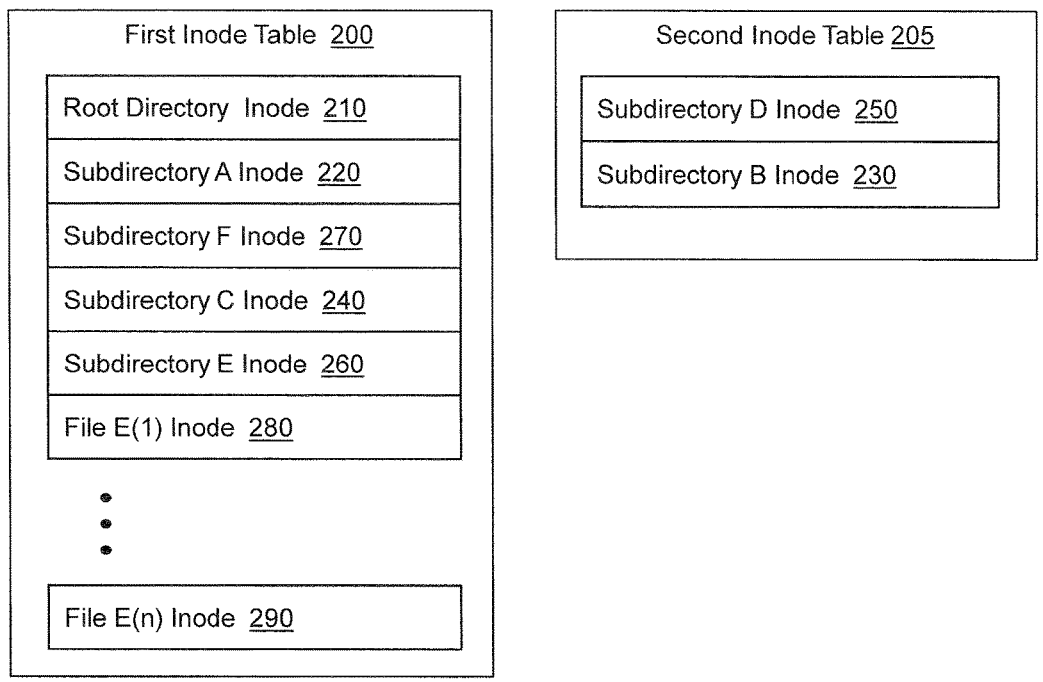
FIG. 2 illustrates a prior art example of inode tables used in a hierarchical file system.

FIG. 2 illustrates an example embodiment of prior art inode tables. The prior art inode tables include a first inode table 200 and a second inode table 205. Conventionally, the inode tables store only the inodes. As described above, as file systems grow to include immense amounts of data, an inode table may be transformed into multiple inode tables located in one or more storage locations on one or more storage devices. As the inode tables attempt to store inodes in one or more storage locations over one or more storage devices, the organization of the inodes breaks down making it potentially difficult to follow a path. For example, the first inode table 200 stores root directory inode 210, subdirectory A inode 220, subdirectory F inode 270, subdirectory C inode 240, subdirectory E inode 260, file E(1) inode 280, and file E(n) inode 290, where n is an integer greater than 1. The second inode table stores subdirectory D inode 250 and subdirectory B inode 230.

An object, regardless of type, may be associated with an inode. For example, root directory inode 210 corresponds to root directory 110 of FIG. 1 and File E(n) inode 290 corresponds to the file E(n) 190 of FIG. 1. Root directory inode 210 contains metadata about the root directory 110. Root directory inode 210 may contain metadata including the current size of the root directory and the location of the root directory. Therefore, the metadata associated with root directory inode 210 is specific to the root directory 110. The inode table 200 does not include ancestry information for the inodes. Therefore, to determine how the inodes in the table are related to one another a hierarchical file system request may be performed. Furthermore, the conventional inode table does not include size constraint information. Therefore, locating an inode does not provide information about the size limitations on the corresponding object.

FIG. 3 illustrates an example of an inode table used in a path lookup in a hierarchical file system by example systems and methods. Inode table 300 includes enhanced inodes. The inode table 300 contains root directory inode 310, subdirectory A inode 320, subdirectory B inode 330, subdirectory C inode 340, subdirectory D inode 350, subdirectory E inode 360, subdirectory F inode 370, file E(1) inode 380, and file E(n) inode 390, where n is an integer greater than 1. While the inode table 300 is illustrated as a table, one of ordinary skill in the art will recognize that the inodes may be stored in other organizational structures. For example, the inodes may be organized in an inode tree. In one embodiment, the organizational structure may be stored in a cache memory.

Figure 6:
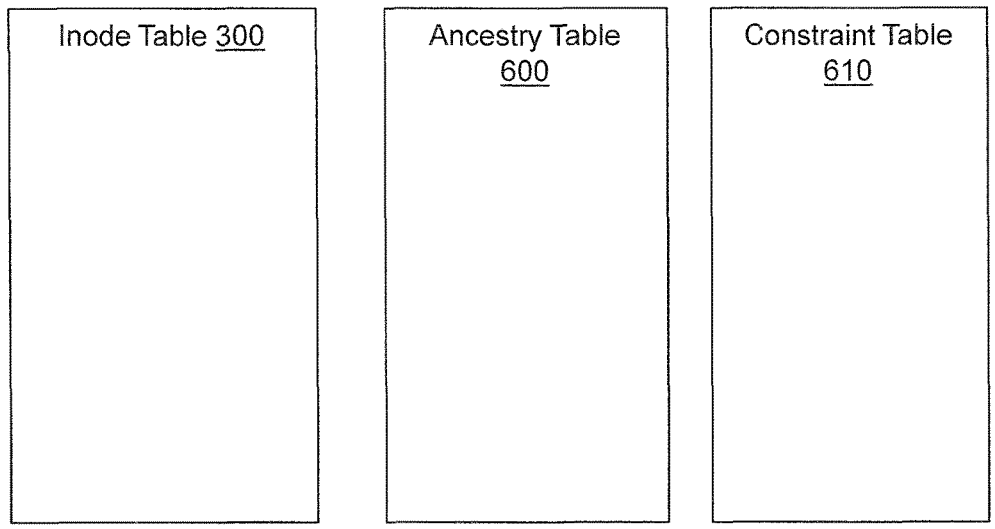
FIG. 6 illustrates an inode table, an ancestry table, and a constraint table.

In addition to storing the inodes, inode table 300 stores ancestry information and size constraints. FIG. 6 illustrates an alternative embodiment where the ancestry information and size constraints are not stored in the inode table 300. Ancestry information may include a listing of inode parents. For example, subdirectory D inode 350 is associated with inode D ancestry information 351. Inode D ancestry information 351 includes the list of parent inodes in the inode chain. Here, the parent of subdirectory D inode 350 is subdirectory A inode 320. The relationship between subdirectory D inode 350 and subdirectory A inode 320 is illustrated in FIG. 1 in the relationship between subdirectory D 150 and subdirectory A 120. It can be seen that the inode chain corresponds with the pathway.

With the ancestry information that the parent of subdirectory D inode 350 is subdirectory A inode 320, subdirectory A inode 320 can be located in the inode table 300. Subdirectory A inode 320 includes inode A ancestry information 321. Inode A ancestry information 321 includes a list of parent inodes on the inode chain. Here, the parent of subdirectory A inode 320 is root directory inode 310. Therefore, with the information that subdirectory A inode 320 is the parent of the subdirectory D inode 350, it is possible to walk up the inode chain to the root directory without having to perform a hierarchical file system request for ancestry information. The root directory inode 310 does not have ancestry information listed in root directory ancestry information 311. A lack of ancestry information may be used to indicate the top level of the hierarchical file system.

While only an immediate parent may be stored in the ancestry information, more of the parent inodes may be stored. For example, inode D ancestry information 351 also includes the root directory inode 310 as a parent. Because the inode chain corresponds with the pathway, it is shown in FIG. 1 that the root directory 110 is not the direct parent of subdirectory D 150. However, root directory 110 is on the pathway of subdirectory D 150 as the parent of subdirectory A 120. Therefore, ancestry information may include objects along the pathway in addition to the immediate parent of an object.

Because parts of the inode table 300 can be stored in a relatively faster location (e.g., cache, memory) the inode chain may be able to be walked without having to access the hierarchical file system on the computer storage medium to locate and retrieve the inodes. If the eviction, replacement, and/or pre-fetch strategies are working well, then accesses to slower devices may be reduced even more. Therefore, example methods and apparatus provide a faster way to walk up the inode chain. In addition to walking up the inode chain more quickly, the example apparatus and methods facilitate navigation of the pathway in the hierarchical file system. Ancestry information may reference objects in the pathway in a similar manner as identifying inodes in the inode chain. For example, objects of the hierarchical file system may be listed in the ancestry information.

Inode table 300 also stores size constraints. FIG. 6 illustrates size constraints and ancestry information being stored outside inode table 300. The size constraints may identify whether the object associated with the inode has a size constraint. For example, subdirectory A inode 320 stores a subdirectory A size constraint 322 to indicate that subdirectory A 120 (shown in FIG. 1) is subject to a size constraint. Subdirectory A size constraint 322 is illustrated as an indicator, specifically a binary value "yes" to indicate that subdirectory A 120 is subject to a size constraint. An indicator in the inode table 300 identifies that there are limitations associated with the object. If more information on a size constraint is needed, it can be easily located using the inode or the associated ancestry information. By making the size constraint information available the inode table can facilitate determining whether a file size altering operation should be performed.

In inode table 300, the size constraint information is stored as a binary indicator. The size constraint information may include additional or alternative information. For example, size constraints may include numerical limitations (e.g., 10 kilobytes (KB), 10 megabytes (MB), 10 gigabytes (GB)) for objects. When a size altering operation is performed, the current size of the object can be compared to the size constraint information. For example, the subdirectory A size constraint 322 may list "1 GB" rather than "Yes." If subdirectory A 120 contains less than 1 GB a size altering operation may be performed. However, if the subdirectory A 120 contains 1 GB or more, the size altering operation may not be performed. Alternatively, the size constraint may define a size range. If performing the size altering operation would cause the object to fall below or exceed the size range the size altering operation may not be performed. These are examples of how the size constraint information may be used. One of ordinary skill in the art will recognize that there are other ways that the size constraint information may be employed.

Figure 4:
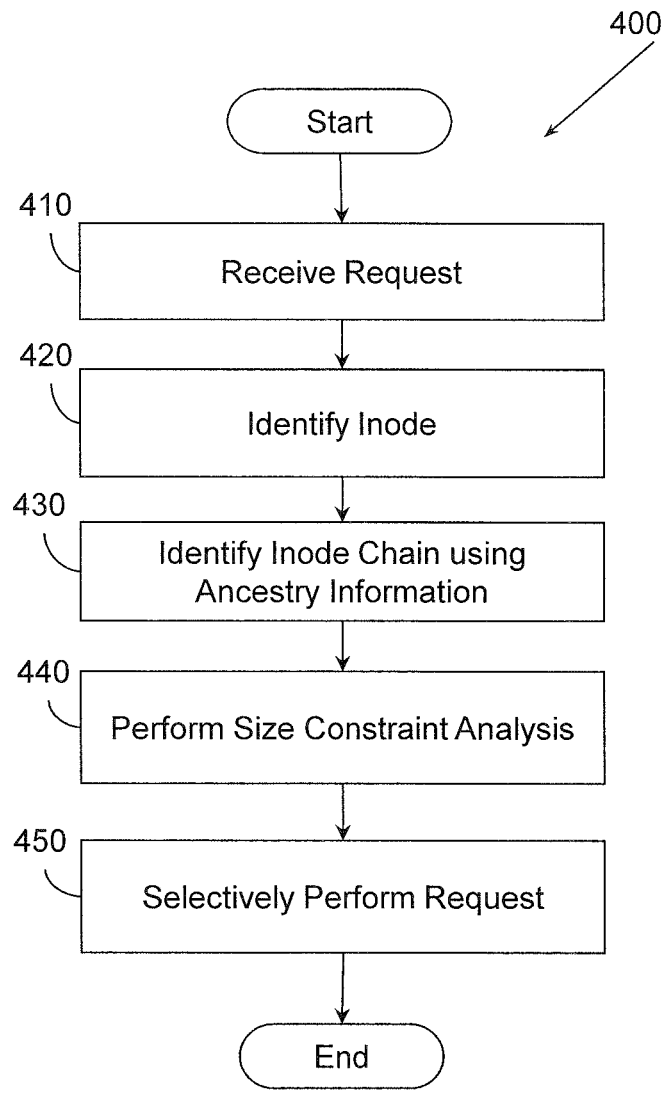
FIG. 4 illustrates an example method associated with an inode table used in path lookup in a hierarchical file system.

FIG. 4 illustrates an example method 400 associated with an inode table used in path lookup in a hierarchical file system. At 410, a request for a size altering operation to be performed on a requested object is received. A size altering request is a request that causes the size of the requested object to be changed or affects the size of an object on a pathway from the requested object to the root directory. For example, a size altering operation may be a save command, a create command, a write command, a write append command, a move command, a relocate command, and a delete command. At 420, an inode associated with the requested object is identified. The inodes may be organized in an inode table and identified in the table using an inode number. Size constraint and ancestry information may be stored in an enhanced inode in an inode table or may be stored in locations external to the inode table (e.g., ancestry table, size constraint table).

At 430, an inode chain associated with the pathway is identified based, at least in part, on ancestry information associated with the inode for the requested object. The ancestry information may provide the parent of the identified inode. Alternatively, the ancestry information may provide the parent of the requested object. At 440, a size constraint analysis is performed for the requested object. In addition to identifying size constraints for the requested object, the size constraint analysis may identify size constraints for objects associated with the pathway. The size constraint analysis may include calculating the resulting size of the requested object if the size altering operation were to be performed. The resulting size of the requested object may be compared to the size constraint of the requested object. This size constraint analysis may be performed for other objects on the pathway.

At 450, the size altering operation is selectively performed. For example, if after a comparison of the resulting size of the requested object to the size constraint of the requested object it is determined that the size altering operation would violate the size constraint, the size altering operation would not be performed. Alternatively, if after a comparison of the resulting size of the requested object to the size constraint of the requested object it is determined that the size altering operation would not violate the size constraint, the size altering operation would be performed.

Figure 5:
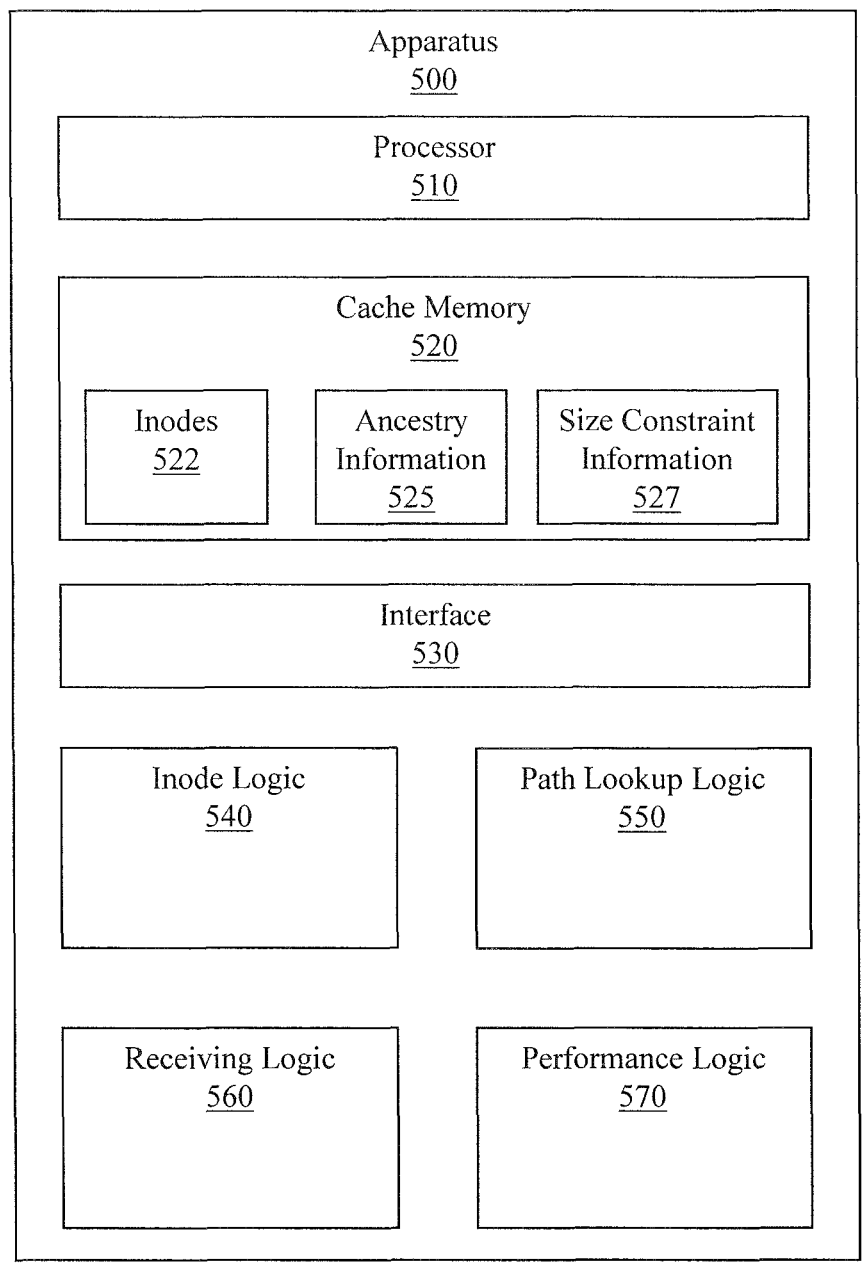
FIG. 5 illustrates an example apparatus associated with path lookup in a hierarchical file system.

FIG. 5 illustrates an example apparatus 500 associated with path lookup in a hierarchical file system. Apparatus 500 includes a processor 510, a cache memory 520, and an interface 530 configured to connect the processor 510, the cache memory 520, and a set of logics. The set of logics may include an inode logic 540, a path lookup logic 550, a receiving logic 560, and a performance logic 570. The cache memory 520 stores inodes 522, ancestry information 525, and size constraint information 527.

Apparatus 500 includes an inode logic 540 configured to identify an inode in a relatively faster storage location (e.g., cache memory 520) for an object associated with the hierarchical file system. The inode may be identified based on an inode number. In addition to locating the inode, the inode logic 540 identifies ancestry information 525 and size constraint information 527 associated with the inode. The ancestry information 525 and size constraint information 527 may be stored in a separate location. In one embodiment, a cache(s) may store size information and/or ancestry information for more inodes than are currently stored in an inode cache.

A path lookup logic 550 is configured to use the ancestry information to discover a pathway in the hierarchical file system associated with the object. The pathway lookup logic 550 may use ancestry data 525 to identify an inode chain that corresponds to the pathway. The path lookup logic 550 also identifies size constraints associated with an inode that affect an object. The path lookup logic 550 may identify size constraints for other objects on the pathway based, at least in part, on the ancestry information 525 and the size constraint information 527 stored in the cache memory 520.

The apparatus 500 may also include a receiving logic 560 that is configured to receive a size altering operation for the object. The apparatus 500 may further include a performance logic 570 to selectively perform the size altering operation based, at least in part, on the size constraint information 527.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by an apparatus control the apparatus to perform a method, the method comprising:
    identifying an inode associated with an object located in a hierarchical file system, where the hierarchical file system has a root directory, where the hierarchical file system has a subdirectory that branches out from the root directory along a pathway, and where the object is subject to a size altering operation;
    identifying an inode chain that describes a pathway in the hierarchical file system from the object through a subdirectory based, at least in part, on ancestry information associated with the inode, where identifying the inode chain includes walking up the inode chain to the root directory by identifying a parent of the inode or by identifying a parent of the object;
    performing a size constraint analysis for the subdirectory on the pathway based, at least in part, on size constraint information associated with the inodes on the inode chain, by calculating a change in size of the object based on a determination that the size altering operation were to be performed and comparing the calculated change in size of the object to a size constraint, where the size constraint limits the amount by which the size of the object is allowed to change in a transaction, where the size constraint information is stored in a size constraint information data structure external to an inode table, where the size constraint information data structure is a b-tree; and selectively performing the size altering operation associated with the object based, at least in part, on the size constraint analysis, wherein at least one of: an inode associated with an object subject to a size constraint is stored more frequently in a cache memory in the apparatus than an inode that is associated with an object that is not subject to a size constraint, or the inode associated with an object subject to a size constraint is stored for a longer period of time in the cache memory than the inode that is associated with an object that is not subject to a size constraint, or the inode associated with an object subject to a size constraint is stored permanently in the cache memory.

2. The non-transitory computer-readable medium of claim 1, where the ancestry information is stored in an ancestry information data structure external to the inode table, and where the ancestry information data structure is a b-tree.

3. The non-transitory computer-readable medium of claim 2, where a portion of the ancestry information data structure is stored in the cache memory in the apparatus.

4. The non-transitory computer-readable medium of claim 1, where a portion of the size constraint information data structure is stored in the cache memory in the apparatus.

5. The non-transitory computer-readable medium of claim 1, where the inodes, ancestry information, and size constraint information are stored in the inode table.

6. The non-transitory computer-readable medium of claim 5, where a portion of the inode table is stored in the cache memory in the apparatus, where the portion of the inode table includes a root inode, where the root inode is stored more frequently in the cache memory than a non-root inode, or where the root inode is stored for a longer period of time in the cache memory than a non-root inode.

7. The non-transitory computer-readable medium of claim 1, where performing a size constraint analysis comprises detecting size constraint information for the subdirectory on the pathway.

8. The non-transitory computer-readable medium of claim 1, where the size constraint information comprises a binary size flag to indicate that the object is subject to a size constraint or that the object is not subject to a size constraint.

9. The non-transitory computer-readable medium of claim 1, where selectively performing the size altering operation comprises performing one of:
performing the size altering operation upon determining that performing the size altering operation would not violate the size constraint; and
cancelling the size altering operation upon determining that performing the size altering operation would violate the size constraint.

10. The non-transitory computer-readable medium of claim 1, where the size altering operation is one of, a save command, a create command, a write command, a write append command, a move command, a relocate command, and a delete command.

11. An apparatus, comprising:
a processor;
a memory configured to store a first data structure configured to store inodes and a second data structure configured to store ancestry information and size constraint information for objects located in a hierarchical file system and having entries in the first data structure, where the hierarchical file system has a root directory, and where the hierarchical file system organizes objects in a pathway, where the first data structure stores a root inode more frequently than a non-root inode, or where the first data structure stores the root inode for a longer period of time than a non-root inode, or where the first data structure stores the root inode permanently, and where the second data structure configured to store ancestry information and size constraint information is a b-tree;
a set of logics; and
an interface configured to connect the processor, the memory, and the set of logics,
the set of logics comprising:
an inode logic configured to identify an inode for an object, and to identify ancestry information and size constraint information associated with the inode; and
a path lookup logic configured to use the ancestry information to discover a pathway, where the pathway describes a path from the root directory to the object through parent objects, and determine whether an object associated with the inode is subject to a size limitation by identifying size constraint information for the parent objects on the pathway, where the size limitation limits the amount by which the size of the object is allowed to change in a transaction, or where the path lookup logic is configured to discover the pathway by walking up an inode chain to the root directory by identifying a parent of the inode or by identifying a parent of the object,
wherein at least one of: an inode associated with an object subject to a size limitation is stored more frequently in a cache memory in the apparatus than an inode that is associated with an object that is not subject to a size limitation, or where the inode associated with an object subject to a size limitation is stored for a longer period of time in the cache memory than the inode that is associated with an object that is not subject to a size limitation, or where the inode associated with an object subject to a size limitation is stored permanently in the cache memory.

12. The apparatus of claim 11, comprising
a receiving logic configured to receive a size altering operation request associated with the object; and
a performance logic configured to selectively perform the size altering operation based, at least in part, on the determination of the size constraint information of the pathway.

13. The apparatus of claim 11, where the first data structure is one of, an inode table, an inode tree, and an inode ranking, and where the b-tree is keyed by an inode number of the root directory.

14. The apparatus of claim 11, where the inode logic is configured to identify stored inodes in the memory using inode numbers, where an inode number is a unique identifier and where the ancestry information and the size constraint information for an object are associated with the object with the inode numbers.

15. The apparatus of claim 11, where the objects are one or more of, a file, a subdirectory, and a root directory.

* * * * *